United States Patent

[11] 3,620,347

| [72] | Inventor | Roy Bruce Wyland<br>Arcadia, Calif. |
|---|---|---|
| [21] | Appl. No. | 858,621 |
| [22] | Filed | Sept. 17, 1969 |
| [45] | Patented | Nov. 16, 1971 |
| [73] | Assignee | J. W. Wyland & Sons, Inc.<br>Rosemead, Calif. |

[54] EGG-HANDLING EQUIPMENT
1 Claim, 3 Drawing Figs.

| [52] | U.S. Cl. | 198/25,<br>198/167 |
|---|---|---|
| [51] | Int. Cl. | B65g 19/22 |
| [50] | Field of Search | 198/25, 167 |

[56] References Cited
UNITED STATES PATENTS

| 3,272,309 | 9/1966 | Reading | 198/25 |
|---|---|---|---|
| 3,302,767 | 2/1967 | Kuhl et al. | 198/25 |

FOREIGN PATENTS

| 1,223,753 | 8/1966 | Germany | 198/167 |
|---|---|---|---|

Primary Examiner—Evon C. Blunk
Assistant Examiner—H. S. Lang
Attorney—Jessup & Beecher ABSTRACT: Egg-handling equipment is provided which includes an improved rotatable drum assembly having an apertured soft resilient peripheral surface, which enables eggs to be controlled and moved without breakage and in spaced relationship from place to place and from one elevation to another.

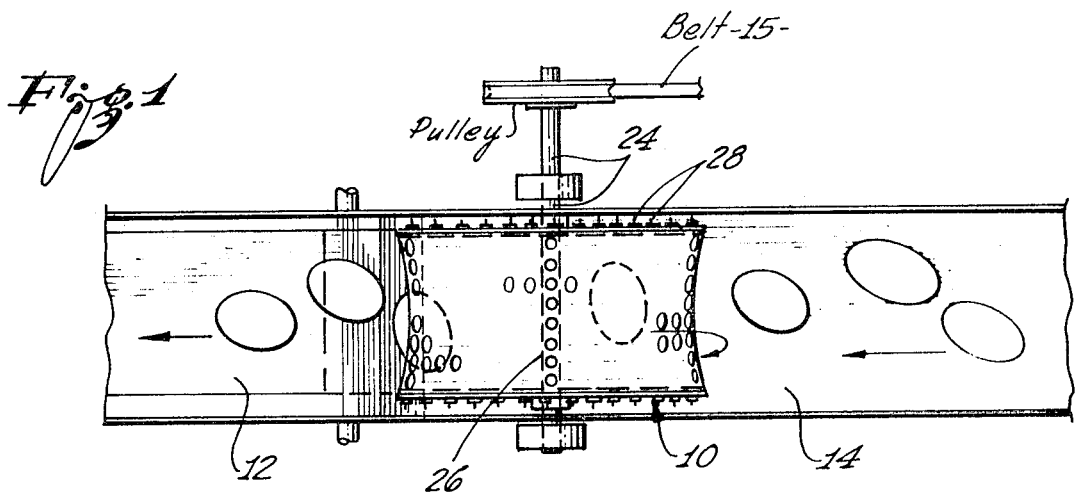
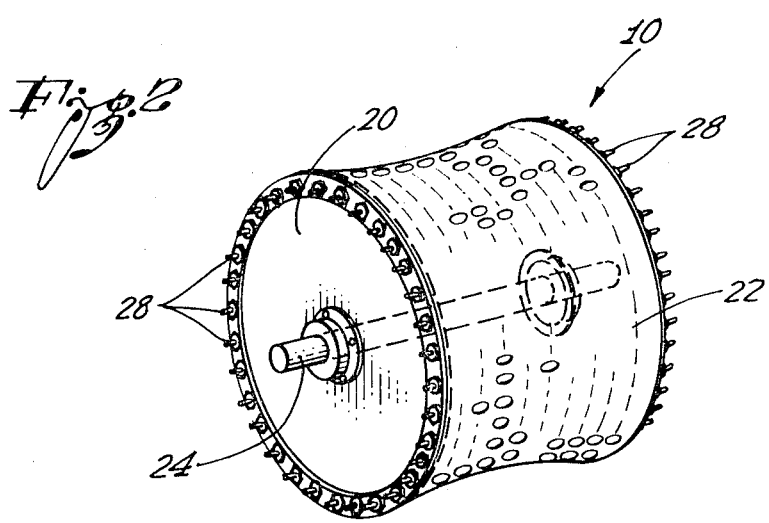
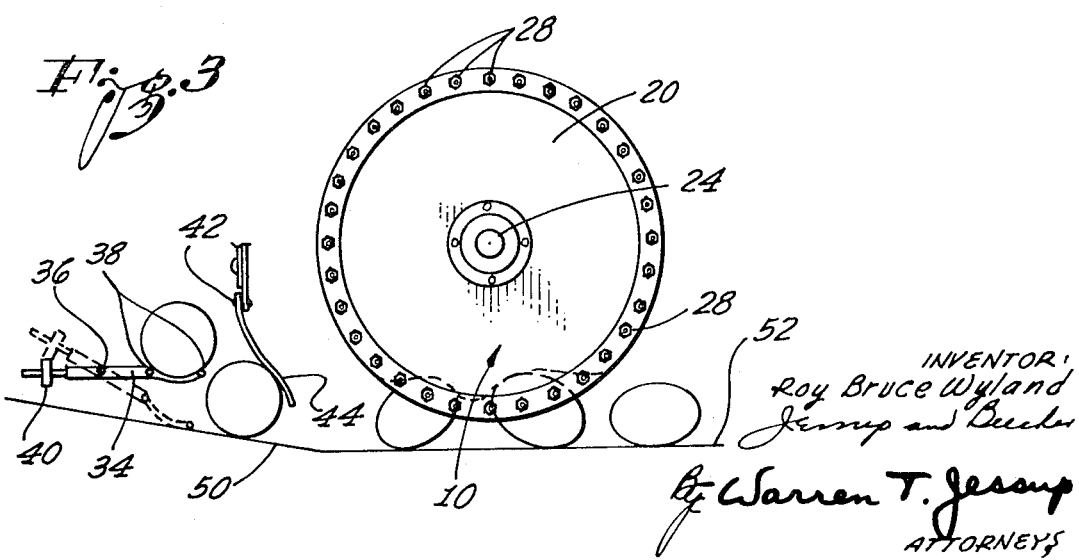

EGG-HANDLING EQUIPMENT

BACKGROUND OF THE INVENTION

Present day egg-handling equipment is constructed to process a large number of eggs and to move the eggs quickly from one point to another without breakage. During the processing it is usual to transport the eggs on a continuous mass production basis to various stations at which, for example, they are candled, cleaned, graded, and packed. It is most important from a production standpoint that the eggs be so moved rapidly and yet without breakage.

The equipment of the present invention, as mentioned above, includes an improved egg-handling means in the form of a rotatable drum assembly. The drum assembly is made up of a pair of parallel end discs, and the peripheral surface of the drum assembly is composed of a soft, resilient, flexible, apertured sheet. The aforesaid sheet is formed, for example, of soft rubber or equivalent material.

The drum assembly described in the preceding paragraph is usually positioned so that its aforesaid peripheral surface extends across a belt conveyor or other means on which the eggs are being moved. The drum assembly serves to hold the eggs yieldably in contact with the moving surface of the conveyor so as to prevent the eggs from rolling against one another with resultant breakage. As will be described, the drum finds particular utility in the lateral transfer of the eggs from a conveyor at one elevation to another conveyor at a different elevation, with the drum serving, for example, to move the eggs gently up or down an incline from one elevation to the other.

BRIEF DESCRIPTION OF THE DRAWING

FIG. 1 is a plan view of a portion of an egg-handling system and which includes a drum assembly constructed in accordance with the concepts of the present invention;

FIG. 2 is a perspective representation of the drum assembly of FIG. 1 and embodying the concepts of the invention; and FIG. 3 is a side elevation showing the drum assembly of FIG. 3 operating in conjunction with a typical egg-weighing system.

DETAILED DESCRIPTION OF THE ILLUSTRATED EMBODIMENT

In the particular system shown in FIG. 1, the eggs being handled are transported from a lower level to a higher level by means of a roller or drum assembly 10 constructed to incorporate the concept of the present invention. The reference numeral 12 indicates generally a conveyor which is used for delivering the eggs to the input region of the drum 10, and the reference character 14 indicates generally a conveyor at a higher elevation than the conveyor 12, and which serves to transport the eggs away from the drum 10.

The drum assembly 10 may be driven by a motor (not shown), through a belt 15, which drives it at approximately the same speed as the conveyors 12 and 14. The drum assembly 10 causes the eggs to move up an incline which is interposed between the conveyors 12 and in the particular mechanism illustrated in FIG. 1; and it moves the eggs along the incline in a spaced relationship, so that there is no tendency for the eggs to move against one another with resultant breakage. The drum assembly 10 may be rotated in the opposite direction, for example, for transporting the eggs down an incline from a higher to a lower conveyor.

The details of the drum assembly are shown, for example, in FIG. 2, and it comprises a pair of circular wheels or end discs 20 and 22 which are mounted in axially spaced parallel relationship, for example, on a central shaft 24, which is driven by the belt 15. The generally cylindrical peripheral surface of the drum assembly is formed by an apertured sheet member 26 which is clamped at the circular peripheral edges of the end discs 22 by appropriate mounting rings, and by mounting screws 28. The peripheral member 26 may be formed, for example, of a sheet of soft rubber or other appropriate flexible and resilient material. It may be supported between the end discs 20 and 22 with any desired degree of tension, so as to exert a predetermined force against the eggs which are guided by the drum. This force may be controlled, for example, by an appropriate selection of the size and number of apertures or holes in the member 26; by adjusting the width of the peripheral edge of the member clamped at each of the discs 20 or 22; or by adjusting the axial position of the side discs 20 and 22 on the drive shaft 24.

As mentioned above, the drum 10 is rotated at a rate such that its peripheral speed approximates the speed of the conveyors 12 and 14. The drum itself may be used simply to slow down the eggs as they are fed onto the belt of a conveyor. The eggs are then actually fed onto the conveyor at a speed matching the speed of movement of the conveyor, so that there is no tendency for the eggs to roll or tumble onto one another on the conveyor. Moreover, and as shown in FIG. 1, for example, the drum 10 may be used either to raise the eggs from a lower conveyor to a higher conveyor, or to lower the eggs from a higher conveyor to a lower conveyor. In the latter instance, the drum prevents the eggs from rolling down the interconnecting ramp and against one another with resulting breakage.

The holes in the resilient member 26 have multiple functions. As mentioned above, they provide some control over the flexibility of the member or sheet. They also have an important function in imparting to the resilient member 26 a gripping capability insofar as the eggs are concerned, and particularly for oily eggs. Without the holes, it has been found that oily eggs, for example, would rapidly cause the peripheral member to become slippery and lose much of its traction. The holes, however, act very much as the tread of a tire, with the oil disappearing through the holes and gathering only in a fine film on the surface of the member.

The resilient peripheral member 26 is advantageous in that there is no tendency for the member to break, and it is capable of long usage in the equipment without any need for replacements. The drum assembly of the invention exhibits, therefore, a durable and rugged structure, and yet one which is capable of gently and yieldably handling the eggs which come in contact with its peripheral surface. The resilient member 26, for example, as suggested above, may be composed of rubber. Artificial rubber (neoprene) rather than natural rubber is presently preferred, because of the resistance of neoprene to deterioration. When a replacement is necessary for the resilient member 28, it may be made relatively inexpensively, merely by removing the original member 28 and clamping in a new member between the side discs.

As shown diagrammatically in FIG. 3, for example, the improved assembly 10 may be used in conjunction with egg-grading equipment which includes a balance beam 34. The balance beam is tiltable about a pivot axis 36, and it has a scale pan in the form of rails 38 over which the eggs are moved. A counterweight 40 is carried by the opposite end of the balance beam 34, and the counterweight is adjusted to cause the balance beam 34 to tilt to the position shown by the broken line so as to discharge an egg of predetermined weight from the rails 38 to an inclined surface 50, while allowing eggs of insufficient weight to move on over the rails 38.

The apparatus shown in FIG. 3 may be provided with a housing 42 having an opening adjacent the rails 38 and provided with yieldable fingers 44. The yieldable fingers serve to prevent bouncing of the eggs as they are discharged from the rails.

The drum assembly 10 in FIG. 3 is located adjacent to the yieldable fingers 44 of the housing 42, and above the inclined surface 50. The drum assembly serves to receive and remove the eggs graded by the weighing balance beam rapidly as they are discharged therefrom. The graded eggs are moved, for example, by the drum from the inclined surface 50 to a conveyor designated by the surface 52. The drum serves to prevent the previously weighed and discharged eggs from interfering with the operation of the weighing device, and keeps the discharged eggs moving, so as to prevent breakage and to permit the processing to proceed at a relatively rapid rate.

The invention provides, therefore, an improved drum assembly which may be used in conjunction with egg-handling machinery, and which provides a cushioning action for the eggs moved by it, while maintaining the eggs in a separated position, so that the equipment may proceed at a high rate of speed without any tendency for breakage of the eggs.

What is claimed is:

1. A roller assembly for controlling movement of eggs over an egg-supporting surface, comprising:
   a pair of substantially parallel, axially spaced circular disc-shaped wheel means;
   means for axially rotatably mounting said wheel means; and
   a substantially continuous generally cylindrical sheet of soft yieldable rubberlike flexible material secured between said pair of wheel means and around the circular periphery thereof, to provide a yieldable wall for engaging the eggs on said surface,
   said sheet being apertured to enhance the traction between sheet and eggs, and to permit adjustment of the flexibility of the sheet.

* * * * *